Figure 1:
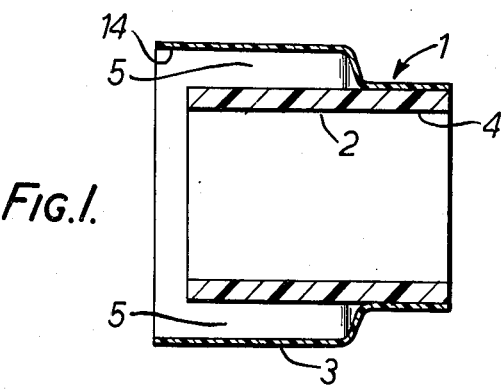

United States Patent [19]

Squires

[11] 4,232,712

[45] Nov. 11, 1980

[54] HEAT-RECOVERABLE ARTICLES

[75] Inventor: David T. Squires, Swindon, England

[73] Assignee: Raychem Limited, London, England

[21] Appl. No.: 945,299

[22] Filed: Sep. 25, 1978

[30] Foreign Application Priority Data

Sep. 30, 1977 [GB] United Kingdom ............... 40791/77

[51] Int. Cl.³ ............................................ F16L 47/00
[52] U.S. Cl. ..................... 138/109; 138/137;
138/148; 138/178; 138/96 T; 174/65 G;
174/152 G; 174/DIG. 8; 428/36; 428/913;
264/230; 156/83; 156/84; 156/86; 285/162;
285/222; 285/381; 285/382.2; 285/382.4;
285/423; 285/DIG. 6; 285/DIG. 10; 403/28;
403/30; 403/273; 29/507; 29/508; 29/DIG. 35;
16/2; 16/108
[58] Field of Search .................. 138/96 R, 96 T, 109,
138/137, 178, 148; 285/158, 159, 162, 196, 221,
258, 423, DIG. 6, DIG. 10, 222, 381, 382.2,
382.4; 174/65 G, 65 R, 152 G, 153 G, DIG. 8;
403/28, 30, 273; 428/913, 36; 264/230; 156/83,
84, 85, 86; 29/507, 508, 512, DIG. 35; 52/244;
16/2, 108

[56] References Cited

U.S. PATENT DOCUMENTS

| 2,550,583 | 4/1951 | Millar | 285/258 |
|---|---|---|---|
| 3,243,206 | 3/1966 | Samer | 174/65 G X |
| 3,243,211 | 3/1966 | Wetmore | 174/DIG. 8 |
| 3,382,121 | 5/1968 | Sherlock | 264/230 X |
| 3,421,782 | 1/1969 | Kalish et al. | 285/258 X |
| 3,448,182 | 6/1969 | Derbyshire et al. | 264/230 X |
| 3,518,359 | 6/1970 | Trimble et al. | 174/DIG. 8 |
| 3,548,079 | 12/1970 | Jones et al. | 285/158 X |
| 3,975,039 | 8/1976 | Penneck et al. | 285/423 |
| 3,985,951 | 10/1976 | Harris | 264/230 X |
| 4,092,193 | 5/1978 | Brooks | 156/83 |
| 4,104,095 | 8/1978 | Shaw | 156/83 |
| 4,133,312 | 1/1979 | Burd | 285/423 X |

FOREIGN PATENT DOCUMENTS 1238144 7/1971 United Kingdom .

Primary Examiner—James E. Bryant, III
Attorney, Agent, or Firm—Lyon & Lyon

[57] ABSTRACT

A heat-recoverable article for protecting a conduit, for example, an electric cable, where its conductors pass through an aperture in a bulkhead, in order, for example, to prevent chafing; the article has an inner expansible and an outer shrinkable sleeve, the outer jacket of the cable terminating in an annular space between the sleeves, the space shrinking on heating of the article; one end of the inner sleeve is expansible to grip the bulkhead.

20 Claims, 4 Drawing Figures

U.S. Patent Nov 11, 1980 4,232,712

HEAT-RECOVERABLE ARTICLES

This invention relates to heat-recoverable articles, and to their uses, especially uses in electrical apparatus.

The ever-increasing requirements to save space, and weight, in electrical equipment of all types have caused all parts of the equipment to be reduced in size whenever possible. This has resulted in various problems, of which one is the increasing difficulty of assembling and taking apart complex systems, simply because access to, for example, nuts and bolts by which the mechanical support and protective cases are held together is prevented by closely spaced cables passing through the walls of the cases.

To prevent wear of and damage to cable jackets or individual conductors, and to provide strain relief, it is normal to terminate a cable at a wall, or bulkhead, or to provide a grommet which allows the cable to pass through the wall and protects it from chafing if its position relative to the wall is changed, either longitudinally or transversely.

Previously proposed methods and devices for this purpose have taken many forms, but they all suffer to a greater or lesser extent from the disadvantage of occupying a significantly greater cross-section than either the aperture in the wall or the cable to be protected. For example, in British Pat. No. 1,238,144, there is disclosed a grommet formed of heat-shrinkable material, of generally tubular form, having an integral external flange intermediate its ends. When the grommet is heated, one end portion shrinks, reducing its cross-sectional area (to shrink about a cable passing through it). The other end expands to lie generally parallel to the external flange; when the external flange is positioned against a wall, with the other end passing through an aperture in the wall, the expansion of the end locks the grommet into position at the wall.

The diameter of the flange in the grommet of the above-mentioned specification is significantly greater than the diameter of the aperture in the wall and many times greater than that of the cable, and accordingly the closest approach of two adjacent cables is determined by the flange size, rather than by the cables themselves.

Similarly, bulky lateral extensions of the grommets, even on one side of a wall, will make difficult the access to nuts, knobs, or similar parts concerned with the mechanical set-up, rather than the electrical connections, of the apparatus, and consequently make installation and maintenance more time-consuming and expensive.

The present invention is concerned with providing a device to locate and, if desired, seal the end of a conduit in a wall at an aperture therein; the conduit may carry within it electrical conductors which extend beyond the end of the conduit and pass through the aperture in the wall.

The present invention provides an article comprising an inner sleeve, having both first and second ends open, and an outer sleeve, a portion of which is heat-shrinkable and extends over and is spaced apart from a portion only of the length of the inner sleeve, the outer sleeve being attached to the inner sleeve preferably at or near the first end of the outer sleeve, which is preferably closed, the second end of the outer sleeve being open and advantageously being positioned over the second end of the inner sleeve, at least a portion of the inner sleeve between its first end and the portion spaced apart from the outer sleeve being heat-expansible.

It will be understood that the first end of the inner sleeve corresponds to the first end of the outer sleeve, and their second ends likewise correspond.

Advantageously, the heat-expansible portion of the inner sleeve is its first end region.

In a preferred embodiment, the present invention provides a dimensionally heat-unstable article having an inner sleeve, at least a portion, preferably an end region, of which is heat-expansible, at least a portion of the inner sleeve being surrounded by a second, heat-shrinkable sleeve spaced apart therefrom, to provide an annular space between them, the cross-section of which space, and the cross-sectional area of which space, is reduced on heating, advantageously by the expansion of the inner sleeve as well as by the shrinkage of the outer sleeve.

Advantageously, the inner sleeve is tubular. Advantageously, at least the portion of the outer sleeve that is spaced apart from the inner sleeve is also tubular and coaxial with the inner sleeve, the space between them accordingly being of annular cross-section, when the tube is, as preferred, of circular section.

The first end of the outer sleeve may be and preferably is positioned around the first end of the inner sleeve, provided that the portion of the outer sleeve in contact with the heat-expansible portion of the inner sleeve does not prevent or, preferably, even substantially hinder the expansion thereof. As the inner sleeve recovers, it advantageously contracts longitudinally, while the outer sleeve attempts to contract radially, these two forces being approximately at right angles, with the result that, in position in an aperture, the end of the inner sleeve flares and the end of the outer sleeve peens over the end of the inner sleeve, to provide a secure attachment of the article to the wall.

The article is conveniently manufactured in two parts, one comprising the inner, the other the outer, sleeve. It may also contain further parts, which may be heat-shrinkable or expansible, which may themselves be unitary, or not, with the essential parts of the article, as required. For example, electrically conductive braid may be positioned over the inner sleeve and within the outer sleeve from a point in the spaced apart portion of the first end, and advantageously beyond, to provide electrical conductivity and/or shielding for a screened conduit.

Advantageously, the article comprises coaxial inner and outer sleeves, of substantially equal length and with approximately aligned ends, the inner and outer sleeves being in contact from a first end to an intermediate position, and separated by a space of annular cross-section from the intermediate position to the second end, the portion of the outer sleeve from the intermediate position to the second end being heat-shrinkable, and the portion of the inner sleeve from the intermediate position to the first end being heat-expansible.

The whole of the inner sleeve may be heat-expansible, and preferably the portion of the inner sleeve spaced apart from the heat-shrinkable outer sleeve is heat-expansible. By this means, the space between the two sleeves may, on heating, be shrunk in cross-section and any article placed therein tightly gripped. Appropriate portions of the surfaces may have applied thereto an adhesive, for example a hot melt adhesive.

One use of the article will be given by way of example. The article is especially suitable for use with a "convoluted" cable jacket, which is a flexible generally tubular article having circumferential corrugations or a helical groove with a pitch such that the jacket resembles a corrugated jacket.

Such jacketing is flexible, and is frequently used to surround a multiway cable, which in turn has to be attached to a multiway connector. One particular connector, for use with which the article of the present invention is suitable, has a casing with two apertures, of diameter approximately that of a cable jacket, having between them a locking spindle which must remain accessible when the cables are in place.

An article according to the invention having an external diameter, at the portion or portions where the outer sleeve is not spaced apart from the inner, substantially equal to the diameter of the aperture is advantageously chosen.

In use, the end of the cable jacket is cut and inserted into the space between the inner and outer sleeves of the article, which is then heated in a way that avoids expansion of the part that is to expand when in position in the aperture. The outer sleeve shrinks, and the portion of the inner sleeve below the outer shrinkable sleeve expands if, as is preferred, it is heat-expansible. The article, carrying the convoluted jacket, may be stored, and when required for use, inserted into the aperture, so that the end of the jacket abuts the wall of the connector about the aperture. The free end of the article is then heated to cause it to expand to grip the wall surrounding the aperture on the opposite face from the cable jacket. Of course, it is possible to carry out the operations in reverse order, or simultaneously, but in practice the first-described order is more often appropriate. Although the jacket may be freely rotatable in the aperture, axial movement is now prevented in both directions. If desired, the outer surface of the article may be provided with an adhesive, to give environmental sealing to the connector interior.

Articles constructed in accordance with the invention can be used to connect a large diameter conduit to a small diameter aperture or small diameter conduits to large diameter apertures.

It is also within the scope of the invention to provide an article having an outer sleeve at each end of the inner sleeve, so that, for example, a cable jacket may be terminated on both faces of an aperture in a wall. In this embodiment, it is desirable that the article be sufficiently flexible that it can be deformed, for example folded about a line parallel to its axis, to enable it to be passed through the aperture.

The materials of the two sleeves may be any material capable of having the property of heat-recovery imparted thereto. Examples of such materials, and of methods of imparting recovery, are disclosed in U.S. Pat. No. 3,086,242, to Cook and Muchmore, Pat. No. Re. 28,688 to Cook, and British Pat. No. 1,033,959 the disclosures of which are incorporated by reference herein. An especially suitable polymeric material for the heat-expansible portion is the blend described in Sample 8 of Example 2 of British Specification No. 1,337,951, the disclosure of which specification is incorporated by reference. The materials disclosed therein are polymeric materials; heat-recoverable metals, for example, those disclosed in U.S. Pat. Nos. 3,012,882 and 3,174,851, and British Pat. Nos. 1,315,652, 1,315,653, 1,346,046, and 1,346,047 may also be used. Of course, the materials of the two sleeves must be chosen to be compatible with each other—both sleeves may of course be made of the same material. The material of the article must also be chosen with regard to the intended substrates (i.e., the wall in which the aperture is formed), the contents of the space between the sleeves, and the material located within the inner sleeve. The suitability includes considerations of melting temperature of substrates and recovery temperatures of the sleeves, as well as bondability.

At least the expansible sleeve should have a fast response to the application of heat; preferably the material has a high modulus at room temperature. Preferably the material comprises a blend of polymers, at least one of which is elastomeric. Preferably, the modulus of the inner sleeve material is greater than that of the outer sleeve material, and preferably the inner sleeve is less flexible than the outer.

The article of the invention has the advantage that, when installed and recovered about a cable jacket or other substrate in the space between the inner and outer sleeves, it provides a termination that is relatively short, which assists in providing access to an item on the wall carrying the article, even if it is positioned closely thereto, since the flexibility of the portion of the cable close to the aperture is not hampered.

The invention also provides a method of attaching an elongate hollow member to a wall at an aperture in the wall, which comprises inserting at least a part of the member into the space between the inner and outer sleeves of an article constructed in accordance with the invention, heating to shrink the outer sleeve about the member, inserting the article into the aperture so that a heat-expansible portion of the inner sleeve not spaced apart from the outer sleeve extends through the aperture to the side of the wall remote from the member and heating to expand the heat-expansible portion to bring the outer surface of the member into contact with the face of the wall.

The heating to cause shrinking and recovery may be, for example, carried out by use of a hot air gun, or other external heat source preferably one from which heat may be directed at small areas of the article. Advantageously, when installing the article in an aperture, heat is first directed at the interior of the article to cause longitudinal contraction of the inner sleeve. Alternatively, the article or portions may be made electrically resistive, so that by passing a current through appropriate portions, they may be heated, in turn, to shrink and expand.

Figure 2:
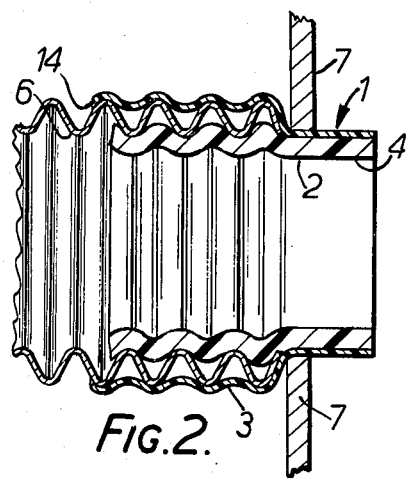
Figure 3:
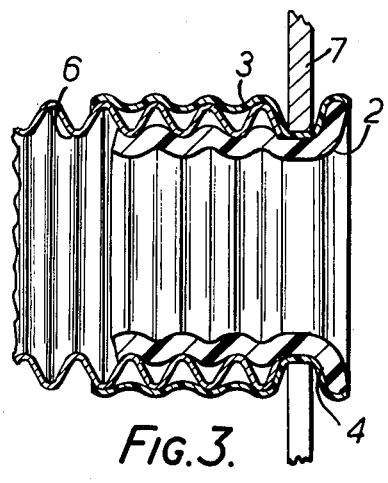
Figure 4:
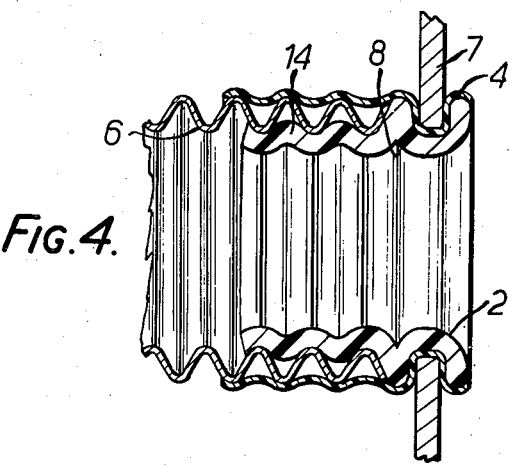

Two forms of article constructed in accordance with the invention will now be described, by way of example only, with reference to the accompanying drawings in which:

FIG. 1 shows a section through a first article, in a dimensionally heat-unstable condition, FIG. 2 shows a section through the article of FIG. 1, recovered over a member and positioned for installation in an aperture in a wall, FIG. 3 shows the article after installation, while FIG. 4 shows a second article after installation.

Referring now to the drawings, and more especially FIG. 1, there is shown an article, indicated generally by the reference numeral 1, comprising an inner tubular sleeve 2 and an outer sleeve 3. At least the end region 4 of the sleeve 2 (the right hand end as shown in the drawings) is heat-expansible, to increase its cross-section. The outer sleeve 3, at its left hand end 4, and for a substantial portion of its length, is of sufficiently large cross-section to provide a space 5 of annular cross-section between it and the underlying portion of the inner sleeve 2. The portion of the outer sleeve 3 that is spaced apart from the inner sleeve 2 is heat-shrinkable, to reduce its cross-section. The transition between the spaced apart portion of the outer sleeve 3 and the portion in contact with the inner sleeve 2 may be made abrupt, in order to assist seating and sealing of the article against a wall. The outer surface of this transitional region may be provided with an adhesive or sealant. The article may be assembled by, for example, placing the inner sleeve over a mandrel, which may be cooled, and positioning a heat-shrinkable sleeve over it, and shrinking one end (the right hand end) into engagement with the inner sleeve. If desired, the surfaces of the two sleeves that are to be in contact are provided with an adhesive (not shown) as may any other portions of the article's surface.

Referring now to FIG. 2, the article is shown with the end of a convoluted cable jacket 6 installed into the space 5 between the sleeves, the end portion 4 of the outer sleeve 3 having been recovered to grip the jacket 6. The article 1 is positioned in an aperture in a wall 7.

Referring now to FIG. 3, the article 1 is shown after the end portion 4 of the inner sleeve has been expanded by heating, to contact a face of the wall 7.

Referring now to FIG. 4, there is shown after installation an arrangement which differs from that shown in FIG. 3 solely in that a portion 8 of the inner sleeve 2 that carries the end of the jacket 6 has also been expanded, to force the overlying portion of the outer sleeve to move tightly against the face of the wall 7.

It has been found that the length of the portion of the article which in use extends beyond the face of the wall remote from the spaced apart portion should be at least about three times the wall thickness.

I claim:

1. An article for attaching an elongate member to a wall at an aperture in the wall, the article comprising an inner sleeve, having both first and second ends open, and secured thereto an outer sleeve having first and second ends, the second end of the outer sleeve being open, at least a portion of the section of the outer sleeve between the second end of the outer sleeve and where the outer sleeve is secured to the inner sleeve being heat-shrinkable and extending over and being spaced apart from a portion only of the length of the inner sleeve, thus forming a securing part of the article for securing the elongate member to the article, at least a portion of the inner sleeve remote from the securing part of the article being heat-expansible, thus forming an attachment part of the article adapted to be passed through the aperture and when heated to expand to attach the article to the wall.

2. An article as claimed in claim 1, wherein the outer sleeve is attached to the inner sleeve at or near the first end of the outer sleeve.

3. An article as claimed in claim 2, wherein the first end of the outer sleeve is closed.

4. An article as claimed in claim 1, wherein the second end of the outer sleeve is positioned over the second end of the inner sleeve.

5. An article as claimed in claim 2, wherein the first end of the outer sleeve is secured to the first end of the inner sleeve and wherein the inner sleeve is formed of a material so that heat-expansion of the inner sleeve is accompanied by longitudinal contraction thereof, heating of the article resulting in flaring of the first end of the inner sleeve and peening of the first end of the outer sleeve over the first end of the inner sleeve.

6. An article as claimed in claim 1, wherein the first end of the outer sleeve is positioned over the first end of the inner sleeve, without substantially hindering the expansion thereof.

7. An article as claimed in claim 1, wherein the inner sleeve is tubular.

8. A dimensionally heat-unstable article for attaching an elongate member to a wall at an aperture in the wall, the article having an inner sleeve, at least a portion of which is heat-expansible, at least a portion of the inner sleeve being surrounded by an outer, heat-shrinkable sleeve secured thereto, a portion of the outer sleeve being spaced apart from the inner sleeve to provide an annular space between them, thus forming a securing part of the article for securing the elongate member to the article, the cross-section of which space, and the cross-sectional area of which space, are reduced on heating of the article, wherein the expansible portion of the inner sleeve at least includes a portion of the inner sleeve remote from the annular space as an attachment part of the article adapted to be passed through the aperture and when heated to expand to attach the article to the wall.

9. An article as claimed in claim 8, wherein the heat-expansible portion of the inner sleeve is an end region thereof.

10. An article as claimed in claim 8, wherein the reduction takes place by expansion of the inner sleeve and contraction of the outer sleeve.

11. An article as claimed in claim 10, wherein the inner sleeve is tubular.

12. An article as claimed in claim 11, wherein the portion of the outer sleeve spaced apart from the inner sleeve is tubular and coaxial therewith.

13. An article as claimed in claim 11, wherein the inner sleeve is of circular cross-section.

14. An article as claimed in claim 8, wherein a heat-shrinkable portion of the outer sleeve is secured to a heat-expansible portion of the inner sleeve and wherein the inner sleeve is formed of a material so that heat-expansion of the inner sleeve is accompanied by longitudinal contraction thereof.

15. A dimensionally heat-unstable article for attaching an elongate member to a wall at an aperture in the wall, which comprises coaxial inner and outer sleeves of substantially equal length and with approximately aligned ends, the inner and outer sleeves being in contact from a first end to an intermediate position in an attachment part of the article, the inner and outer sleeves being separated by a space of annular cross-section from the intermediate position to the second end in a securing part of the article, the portion of the outer sleeve from the intermediate position to the second end being heat-shrinkable, and the portion of the inner sleeve from the intermediate position to the first end being heat-expansible and adapted to be passed through the elongate member to the article in the securing part of the article.

16. An article as claimed in claim 15, wherein the whole of the inner sleeve is heat-expansible.

17. An article as claimed in claim 8, wherein at least a portion of the surface of the article has an adhesive applied thereto.

18. An article as claimed in claim 17, wherein the adhesive is a hot melt adhesive.

19. An article as claimed in claim 8, wherein the modulus of the inner sleeve material is greater than that of the outer sleeve material.

20. An article as claimed in claim 8, wherein the inner sleeve is less flexible than the outer sleeve.

* * * * *